United States Patent
Torbatian et al.

(10) Patent No.: US 12,526,072 B2
(45) Date of Patent: Jan. 13, 2026

(54) POWER CONSUMPTION REDUCTION IN SOFT DECODING OF GENERALIZED PRODUCT CODES

(71) Applicant: Infinera Corporation, San Jose, CA (US)

(72) Inventors: Mehdi Torbatian, Ottawa (CA); Alex Nicolescu, Ottawa (CA); Han Henry Sun, Ottawa (CA)

(73) Assignee: Infinera Corporation

( * ) Notice: Subject to any disclaimer, the term of this patent is extended or adjusted under 35 U.S.C. 154(b) by 761 days.

(21) Appl. No.: 17/479,747

(22) Filed: Sep. 20, 2021

(65) Prior Publication Data
US 2022/0094470 A1 Mar. 24, 2022

Related U.S. Application Data

(60) Provisional application No. 63/081,417, filed on Sep. 22, 2020.

(51) Int. Cl.
*H04L 1/00* (2006.01)
*H04W 52/02* (2009.01)

(52) U.S. Cl.
CPC .......... *H04L 1/0045* (2013.01); *H04L 1/0057* (2013.01); *H04L 1/0059* (2013.01); *H04L 1/0071* (2013.01); *H04W 52/0209* (2013.01)

(58) Field of Classification Search
CPC ... H04L 1/0045; H04L 1/0057; H04L 1/0059; H04L 1/0071; H04L 1/0051; H04L 1/0066; H04W 52/0209; H04W 52/0251; Y02D 30/70; H03M 13/2906; H03M 13/453; H03M 13/152

See application file for complete search history.

(56) References Cited

U.S. PATENT DOCUMENTS

| | | | |
|---|---|---|---|
| 2015/0236723 A1* | 8/2015 | Dowling | H03M 13/6502 714/755 |
| 2018/0048332 A1* | 2/2018 | Kumar | H03M 13/2927 |

(Continued)

FOREIGN PATENT DOCUMENTS

| | | | | |
|---|---|---|---|---|
| EP | 1083660 A1 * | 3/2001 | | G11B 20/10 |

OTHER PUBLICATIONS

Ahn et al. "Low Complexity Syndrome-Based Decoding Algorithm Applied to Block Turbo Codes," IEEE Access., vol. 6, pp. 26693-26706, Apr. 2018 (Year: 2018).*

(Continued)

*Primary Examiner* — Ayaz R Sheikh
*Assistant Examiner* — David Zhijun Sun

(57) ABSTRACT

Systems and methods for more efficiently decoding generalized product codes (GPC) are described. A receiving device equipped with a decoder is configured to receive GPC-encoded signals and implement an early termination method to avoid executing multiple operations of the decoding scheme typically used by the receiving device. The receiving device can identify whether a particular condition is satisfied when decoding a signal, and if the condition is satisfied, can omit certain operations of the decoding scheme and thereby reduce power consumption. The particular condition can be satisfied when the syndromes for sign bits in a codeword associated with the received signal are zero.

16 Claims, 6 Drawing Sheets

(56) References Cited

U.S. PATENT DOCUMENTS

2019/0036550 A1* 1/2019 Koike-Akino .... H03M 13/2906
2021/0288674 A1* 9/2021 Sedaghat ......... H03M 13/6502

OTHER PUBLICATIONS

Pyndiah "Near-optimum decoding of product codes: block turbo codes," IEEE Transactions on Communications, vol. 46, No. 8, pp. 1003-1010, Aug. 1998 (Year: 1998).*
Lu et al., "A syndrome-based hybrid decoder for turbo product codes," Proc. IEEE 3CA, Tainan, Taiwan, May 2010, pp. 280-282. (Year: 2010).*

* cited by examiner

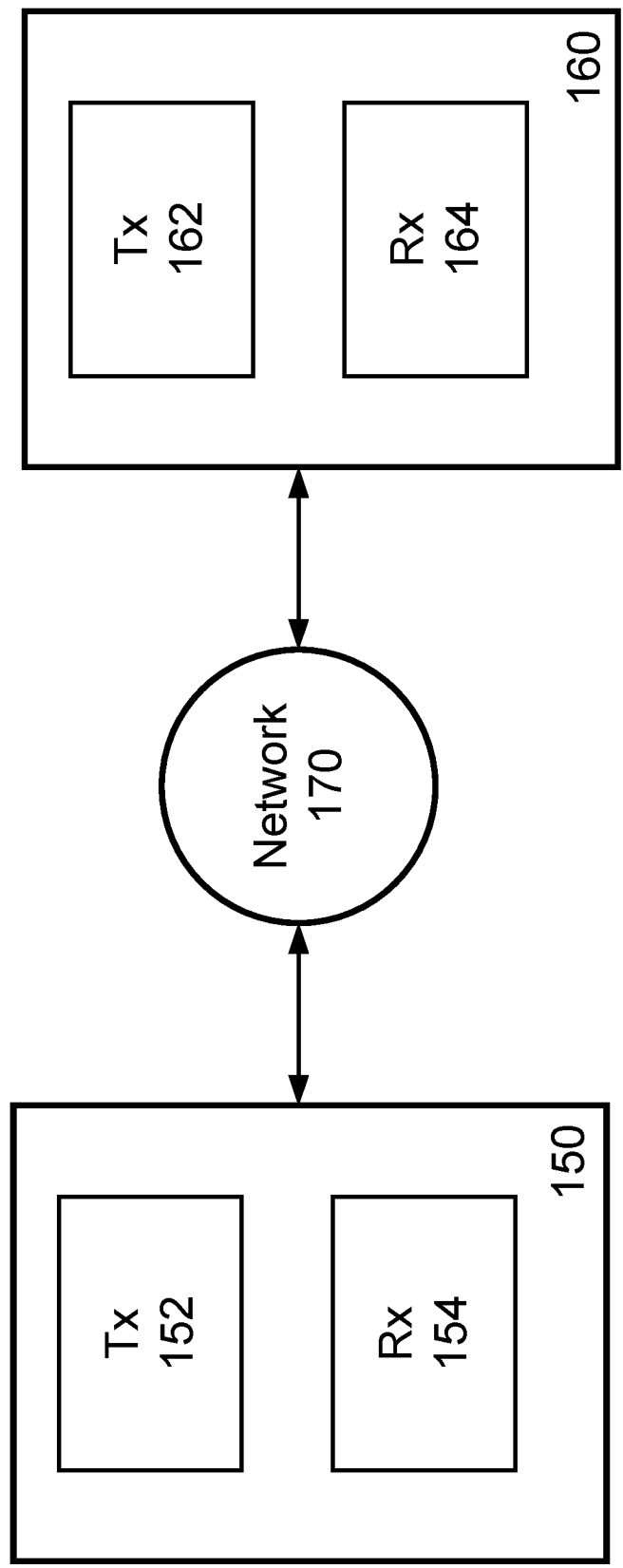

POWER CONSUMPTION REDUCTION IN SOFT DECODING OF GENERALIZED PRODUCT CODES

CROSS-REFERENCE TO RELATED APPLICATION

This application claims the benefit of U.S. Provisional Application No. 63/081,417, filed Sep. 22, 2020, which is incorporated herein by reference in its entirety.

FIELD OF THE DISCLOSURE

This specification generally relates to power optimization in decoders of generalized product codes.

BACKGROUND

Decoders sometimes are deployed in receivers that are part of devices in communication networks. To reduce error, decoders sometimes perform multiple decoding iterations on received data. While having a greater number of iterations may help reduce error, a larger number of iterations also may require greater power consumption. In general, power consumption in decoders can be proportional to the number of decoding iterations. To optimize decoder power consumption, a system and method to limit the number of iterations without substantially impacting decoder performance is desirable.

SUMMARY

This disclosure describes systems, methods, devices, and other implementations for addressing power consumption in decoders decoding generalized product codes.

To reduce power consumption without substantially impacting the decoder performance, an early termination (ET) method for optimizing power consumption in decoders can be utilized. ET for soft decoding of generalized product codes (GPC) codes is of particular interest and benefit because significant power savings can be achieved relative to when ET is not used. A device configured to receive GPC-encoded signals can implement the ET method and avoid executing multiple operations of the decoding scheme typically used by the device without substantially compromising the decoding quality and performance. To do so, the device can identify whether a particular condition is satisfied when decoding a signal, and if the condition is satisfied, can omit certain operations of the decoding scheme and thereby reduce power consumption by reducing the number of operations and iterations performed by the device. The particular condition can be satisfied when syndromes for sign bits in a codeword of the signal are zero.

According to some implementations, a device includes a receiver and at least one processor. The receiver is configured to receive a communication signal from a communication network. The communication signal includes data encoded using a generalized product code. The at least one processor is coupled to the receiver and includes a decoder. The at least one processor is configured to decode the data encoded using the generalized product code (i) according to a first decoding scheme in response to a first condition not being satisfied and to repeat the first decoding scheme for a determined number of iterations, and (ii) according to a second decoding scheme in response to the first condition being satisfied. The second decoding scheme involves a second number of iterations fewer than the determined number of iterations.

In some implementations, the first decoding scheme includes a Pyndiah-Chase decoding scheme, and the second decoding scheme includes an early termination scheme in which multiple operations of the Pyndiah-Chase decoding scheme are not performed.

In some implementations, the second number of iterations comprises three iterations.

In some implementations, the at least one processor is configured to utilize less power when operating according to the second decoding scheme than when operating according to the first decoding scheme.

In some implementations, the generalized product code includes a turbo block code or a continuously interleaved Bose-Chaudhuri-Hocquenghem code.

In some implementations, the first condition is that all the syndromes for sign bits in a codeword of the data is zero.

According to some implementations, a method to decode data encoded using a generalized product code in a communication signal is described. The method includes: receiving the communication signal with the data encoded using the generalized product code from a communication network, determining syndromes for sign bits in a codeword associated with the data encoded using the generalized product code, and determining, by at least one processor, to apply a first decoding scheme in response to a first condition not being satisfied and to apply a second decoding scheme in response to the first condition being satisfied. The first condition is satisfied when the syndromes are zero. The at least one processor decodes the codeword associated with the data encoded using the generalized product code. The decoding is based on the first decoding scheme in response to the first condition not being satisfied and based on the second decoding scheme in response to the first condition being satisfied.

In some implementations, the method further includes determining the sign bits in a codeword vector corresponding to the codeword associated with the data encoded using the generalized product code. The syndromes are determined for the sign bits in the codeword vector that is associated with the data encoded using the generalized product code.

In some implementations, the at least one processor utilizes less power when operating according to the second decoding scheme than when operating according to the first decoding scheme.

In some implementations, the method further includes configuring a second codeword using the sign bits in response to applying the second decoding scheme, In some implementations, the method further includes performing two setting operations in response to applying the second decoding scheme. The two setting operations include: setting values of one or more bits in a first portion of extrinsic information associated with the second codeword according to a product of a scaling factor and the second codeword, and setting values of one or more bits in a remaining portion of the extrinsic information associated with the second codeword to zero.

In some implementations, in response to applying the second decoding scheme, the method further includes setting values of all bits of extrinsic information associated with the second codeword according to a product of a scaling factor and the second codeword.

In some implementations, in response to applying the second decoding scheme, the method further includes setting values of all bits of extrinsic information associated with the second codeword to zero.

In some implementations, the method further includes determining an output log likelihood ratio for each bit of the codeword.

In some implementations, the at least one processor performs less fewer decoding iterations when applying the second decoding scheme than when applying the first decoding scheme.

In some implementations, after performing at least one iteration of the first decoding scheme, the method further includes: determining a second set of sign bits for a codeword generated as a result of performing the at least one iteration; determining syndromes for the second set of sign bits; and determining, by the at least one processor, to apply the first decoding scheme in response to the first condition not being satisfied and to apply the second decoding scheme in response to the first condition being satisfied. The first condition is satisfied when the syndromes for the second set of sign bits is zero. The at least one processor decodes the codeword generated as a result of performing the at least one iteration based on the first decoding scheme in response to the first condition not being satisfied and the second decoding scheme in response to the first condition being satisfied.

In some implementations, the method further includes terminating the method to decode the data encoded using the generalized product code after performing an iteration of the second decoding scheme.

According to some implementations, a receiver includes a memory device and a decoder. The memory device is configured to store data and provide the data to one or more components of the receiver. The decoder is coupled to the memory device and configured to obtain the data from the memory device. The decoder is configured to determine sign bits of a codeword in the data obtained from the memory device, determine syndromes for the sign bits, and decode the codeword based on a first decoding scheme when the syndromes are not zero and based on a second decoding scheme when the syndromes are zero. The codeword is encoded using a generalized product code. The first decoding scheme includes a Pyndiah-Chase decoding scheme, and the second decoding scheme includes an early termination scheme in which multiple operations of the Pyndiah-Chase decoding scheme are not performed.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1 depicts an example of an optical communication system.

Like reference numbers and designations in the various drawings indicate like elements.

DETAILED DESCRIPTION

Figure 2A:
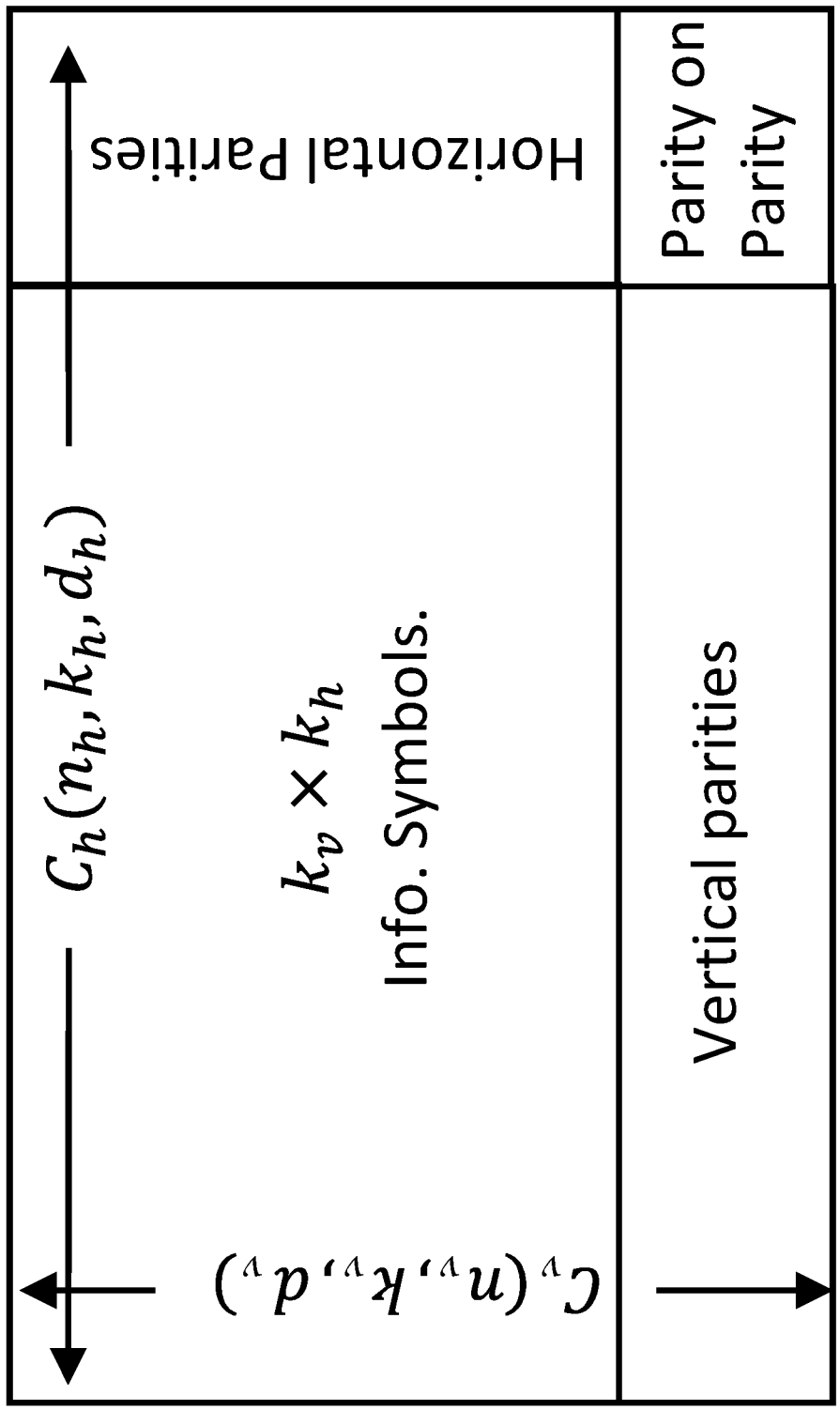
FIG. 2A depicts a structure of an example generalized product code.

FIG. 1 depicts an example communication system in which two devices 150, 160 are configured to communicate with each other over a communication network 170.

Each device 150 and 160 may be an electronic device configured to communicate over a wired and/or wireless network such as communication network 170. Each electronic device may be a portable or non-portable device. In some implementations, devices 150 and 160 are optical devices and can include, but are not limited to, lasers, optical sub-assemblies, original equipment manufacturer (OEM) modules, optical transceivers, sensors, modems, switches, filters, detectors, emitters, amplifiers, decoders, and encoders.

Device 150 can include a transmitter (Tx) 152 to transmit data to other devices, e.g., device 160, using the communication network 170. Device 150 can also include a receiver (Rx) 154 to receive data from other devices, e.g., device 160, via the communication network 170. Similarly, device 160 can include a transmitter (Tx) 162 to transmit data to other devices, e.g., device 150, through communication network 170, and a receiver (Rx) 164 to receive data from other devices, e.g., device 150, via communication network 170. For example, Tx 152 can transmit one or more modulated optical signals to Rx 164 through an optical communication path in the communication network 170. Devices 150 and 160 include various components such as memory devices and processors to process data to be sent and/or received over the communication network. Transmitters Tx 152, Tx 162 and receivers Rx 154, 164 can include antennas and supporting components such as amplifiers and filters to implement the communications.

The communication network 170 can be a wired and/or wireless network to facilitate communication between multiple electronic devices or components. In some implementations, the communication network 170 can include an optical communication network with optical fiber cables that enable transmission of data in the form of light signals between multiple network nodes and devices, such as devices 150 and 160. The optical communication network can include various components and devices to facilitate the transmission of data across the network. These devices include, for example, amplifiers to amplify a modulated optical signal at various locations along an optical communication path in the optical communication network.

Communications between two devices 150 and 160 can be encoded by the transmitting device and then decoded by the receiving device. In general, various suitable coding techniques can be utilized to implement encoding and decoding of data. One category of code that has strong forward error correction (FEC) encoding performances in optical communication systems is generalized product codes (GPCs). Product codes (PCs) protect a two-dimensional array of bits comprising two short block component codes, commonly called horizontal and vertical codes, to protect data in orthogonal directions. GPCs are extensions of PCs and refer to a family of codes that include block codes and convolutional codes.

Examples of GPCs include, but are not limited to, stair-case, braided, half-product, turbo, and continuously-interleaved Bose-Chaudhuri-Hocquenghem (CI-BCH) product codes. An example structure of a GPC, such as a turbo block code, is shown in FIG. 2A, and includes two component linear block codes $C_v(n_v,k_v,d_v)$, and $C_h(n_h, k_h, d_h)$. The component codes protect a block of information symbols of size $k_v \times k_h$ in both vertical and horizontal directions. For both block codes, n, k, d are a codeword length, input sequence length, and the minimum hamming distance of the code. $C_v$ is first applied on every column of the information block to construct an extend block of symbols of size $n_v \times k_h$. Then $C_h$ is applied to every row of the new block to construct the final codeword of the PC of size $n_v \times n_h$ symbols. The minimum hamming distance of the resulted PC is equal to $d_{min}=d_v \times d_h$. One can use the same component code for both vertical and horizontal directions, and can apply the horizontal encoding first followed by the vertical encoding, or vice versa. The parity of each row is provided by parity bits in the right-most column, and the parity of each column is provided by parity bits in bottom-most row.

Figure 2B:
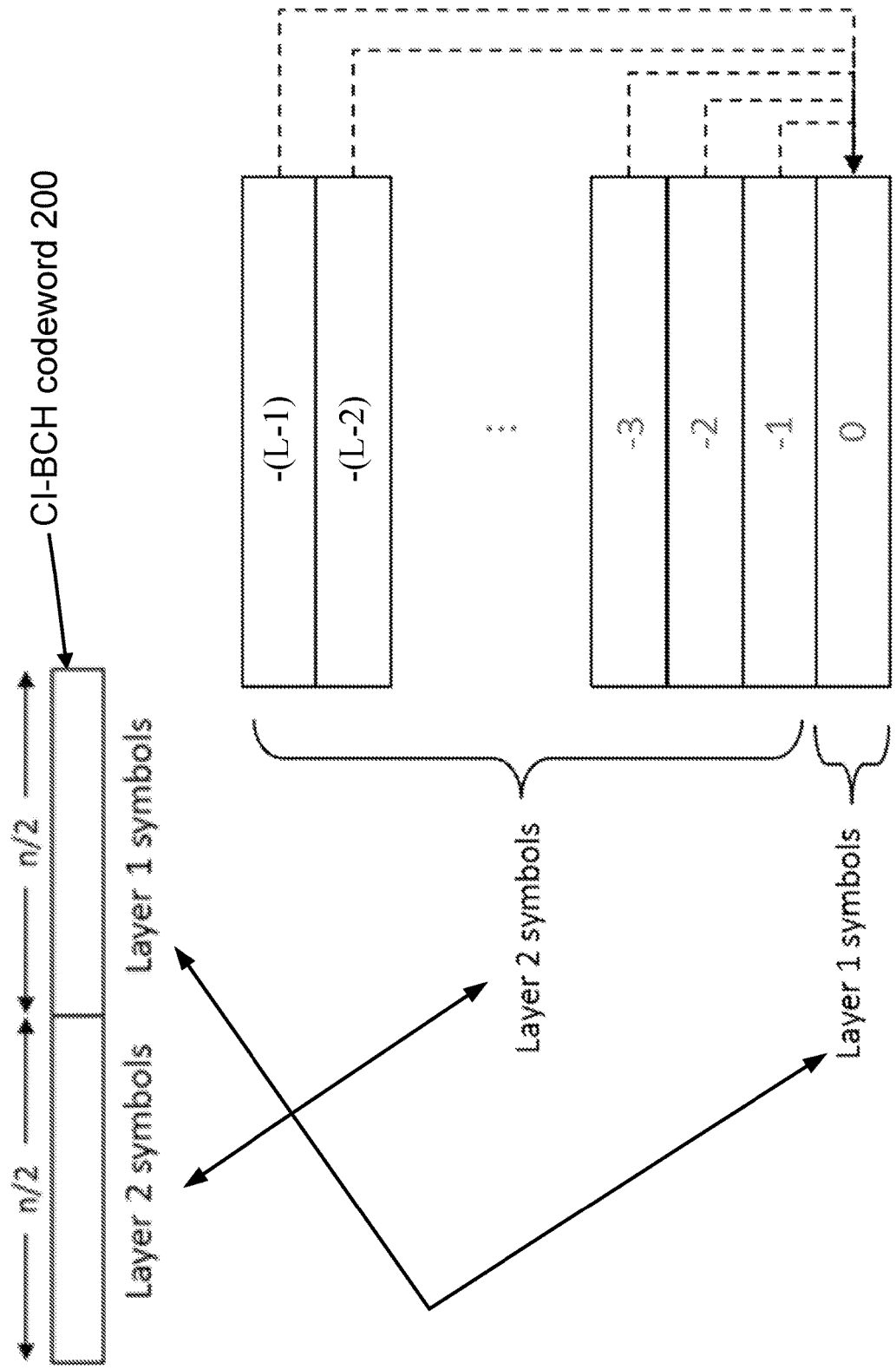
FIG. 2B depicts a structure of an example continuously-interleaved Bose-Chaudhuri-Hocqueng hem (CI-BCH) code.

CI-BCH and braided codes are examples of convolutional GPC codes. An example structure of a convolutional GPC (CI-BCH) codeword 200 is shown in FIG. 2B. In FIG. 2B, "0" represents the current clock cycle, "−1" represents one clock cycle earlier, and "−2" represents the clock cycle before "−1." For a codeword in clock cycle 0, half of the symbols come from the same clock cycle, while the other half comes from encoded symbols from earlier clock cycles. Thus, each component codeword comprises of two parts. The first part consists of symbols that are already encoded at least one time (from clock cycles −1 to −(L−1)), and thus the current codeword is the second layer of protection for them. These symbols are referred to as "Layer 2" symbols. The second part of each codeword comprises of new information symbols and the generated parities. These symbols are referred to as "Layer 1" symbols as they only have been protected one time till encoding of the current codeword. The Layer 1 symbols are stored in the memory after the encoding procedure is completed as encoded symbols in clock cycle 0. They will be used in later clock cycles as Layer 2 symbols. In this manner, PCs can be extended to a convolutional structure carrying the same or better code properties.

Decoding of GPCs can be performed by iteratively applying decoding to the codes. When decoding an encoded received signal, a decoder can perform several iterations of decoding data from the encoded GCC signal. In general, the first few decoding iterations are most active and make most of the corrections to decode a received signal properly. Remaining decoding iterations are sometimes idle yet consume power. Accordingly, after performing the first few decoding iterations, additional iterations may not yield a substantive improvement in performance, while still consuming power.

Figure 3:
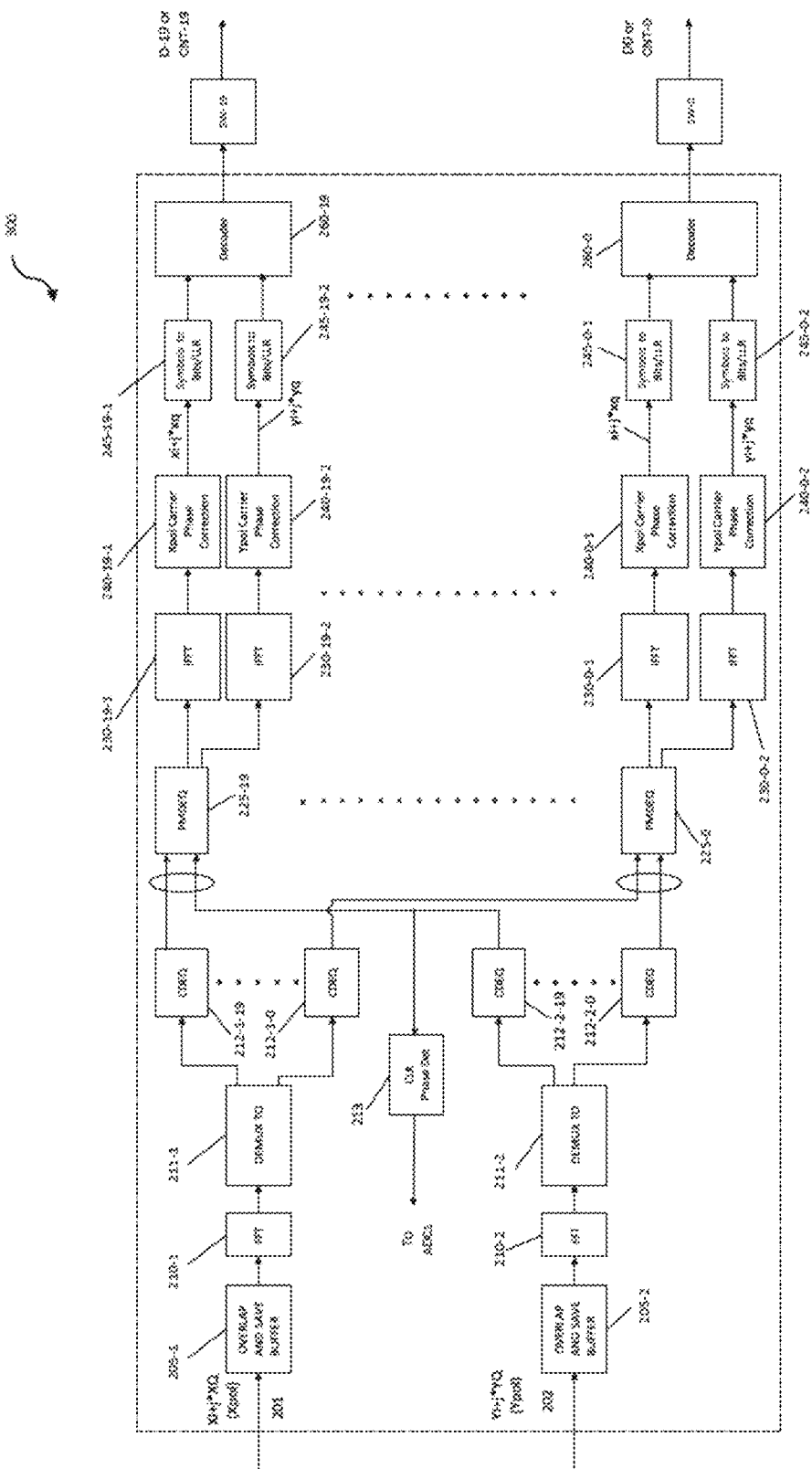
FIG. 3 depicts an example of a processor in an optical receiver.

FIG. 3 illustrates an exemplary implementation of a Rx processor 300 included in a receiver such as Rx 154 or 164. While the Rx processor 300 in FIG. 3 is described below according to certain functional components, in some implementations, the Rx processor 300 can include additional functional components, fewer functional components, different functional components, or differently arranged functional components. Not all the components shown in FIG. 3 are necessary and some components, such as the symbols-to-bits circuits, may optionally be included or excluded. Furthermore, the components of the Rx processor 300 can be arranged in various ways while processing a received signal and implementing the decoding methods described herein. Accordingly, the implementation illustrated in FIG. 3 is merely one example of a receiver system that can execute early termination decoding methods for power optimization described herein.

Referring to FIG. 3, a signal that can include multiple subcarriers can be received from an optical network such as network 170. The received signal can be received by one or more antennas (not shown) and processed by one or more analog-to-digital circuits (ADCs) (not shown) that are configured to output digital samples of the received analog signal. In one example, the samples can be supplied by each ADC at a rate of 64 GSamples/s. The digital samples may correspond to symbols carried by the X polarization of the optical subcarriers and can be represented by the complex number $Xl+jXQ$ 201.

The digital samples can be provided to one or more overlap and save buffer(s) 205, as shown in FIG. 3. One or more fast Fourier transform (FFT) component(s) or circuit (s) 210 can receive the vector elements from the overlap and save buffer(s) 205 and convert the vector elements to the frequency domain using, for example, a FFT. One or more FFT component(s) 210-1 can convert the vector elements to frequency components, each of which can be stored in a register or "bin" or other memory, as a result of carrying out the FFT.

The frequency components can be demultiplexed by one or more demultiplexers 211-1, and groups of such components can be supplied to m respective chromatic dispersion equalizer circuit(s) (CDEQ) 212-1-0 to 212-1-m, each of which can include a finite impulse response (FIR) filter that corrects, offsets or reduces the effects of, or errors associated with, chromatic dispersion of the transmitted optical subcarriers. In the figures and subsequent description m equals the number of subcarriers. For the purposes of this example, the number of subcarriers is twenty (20).

Each of CDEQ circuit(s) 212-1-0 to 212-1-19 supplies an output to a corresponding polarization mode dispersion (PMD) equalizer circuit 225-0 to 225-19 (which collectively can be referred to as PMDEQs 225). PMD equalization can be executed in the frequency domain, as shown in FIG. 3, or it can be executed in the time domain after inverse FFT(s) (IFFT(s)) 230 and before carrier phase correction (CPCs 240).

Digital samples output from ADC(s) associated with Y polarization components 202 of a received signal can be processed in a similar manner to that of digital samples output from ADC(s) associated with the X polarization component of the received signal. Namely, overlap and save buffer 205-2, FFT 210-2, demultiplexer 211-2, and CDEQ circuits 212-2-0 to 212-2-19 can have a similar structure and operate in a similar fashion as buffer 205-1, FFT 210-1, demultiplexer 211-1, and CDEQ circuits 212-1-0 to 212-1-19, respectively. For example, each of CDEQ circuits 212-2-0 to 212-2-19 can include an FIR filter that corrects, offsets, or reduces the effects of, or errors associated with, chromatic dispersion of the transmitted optical subcarriers. In addition, each of CDEQ circuits 212-2-0 to 212-2-19 provide an output to a corresponding one of PMDEQ 225-0 to 225-19.

The output of one of the CDEQ circuits, such as CDEQ 212-1-0, can be supplied to clock phase detector circuit 213 to determine a clock phase or clock timing associated with the received subcarriers. Such phase or timing information or data can be supplied to ADCs to adjust or control the timing of the digital samples output from the ADCs.

Each of PMDEQ circuits 225 can include another FIR filter that corrects, offsets or reduces the effects of, or errors associated with, PMD of the transmitted optical subcarriers. Each of PMDEQ circuits 225 can supply a first output to a respective one of IFFT components or circuits 230-0-1 to 230-19-1 and a second output to a respective one of IFFT components or circuits 230-0-2 to 230-19-2. In some implementations involving 256 samples, each of the IFFT components or circuits 230 can convert a 256-element vector back to the time domain as 256 samples in accordance with an inverse fast Fourier transform (IFFT).

Time domain signals or data output from IFFT 230-0-1 to 230-19-1 are supplied to a corresponding one of XpoI carrier phase correction circuits 240-0-1 to 240-19-1, which can apply carrier recovery techniques. In some implementations, each carrier phase correction circuit 240-0-1 to 240-19-1 can compensate or correct for frequency and/or phase differences between the X polarization of the transmit signal and the X polarization of light from a local oscillator in the receiver based on an output of XpoI carrier recovery circuits 240-0-1 to 240-19-1, which performs carrier recovery in connection with one of the subcarrier based on the outputs of IFFTs 230-0-1 to 230-19-1. After such X polarization carrier phase correction, the data associated with the X polarization component can be represented as symbols having the complex representation $xi+j*xq$ in a constellation, such as a Quadrature Phase Shift Keying (QPSK) constellation or a constellation associated with another modulation formation, such as an m-quadrature amplitude modulation (QAM), m being an integer. In some implementations, the taps of the FIR filter included in one or more of PMDEQ circuits 225 can be updated based on the output of at least one of carrier phase correction circuits 240-0-1 to 240-19-01.

In a similar manner, time domain signals or data output from IFFT 230-0-2 to 230-19-2 are supplied to a corresponding one of YpoI carrier phase correction circuits 240-0-2 to 240-19-2, which can apply carrier recovery techniques. In some implementations, each carrier phase correction circuit 240-0-2 to 240-19-2 also can correct or compensate for frequency and/or phase differences between the Y polarization of the transmit signal and the Y polarization of light from the receiver's local oscillator. After such Y polarization carrier phase correction, the data associated with the Y polarization component can be represented as symbols having the complex representation $yi+j*yq$ in a constellation, such as a QPSK constellation or a constellation associated with another modulation formation, such as an m-quadrature amplitude modulation (QAM), m being an integer. In some implementations, the output of one of circuits 240-0-2 to 240-19-2 can be used to update the taps of the FIR filter included in one or more of PMDEQ circuits 225 instead of, or in addition to, the output of at least one of the carrier recovery circuits 240-0-1 to 240-19-1.

The equalizer, carrier recovery, and clock recovery can be further enhanced by utilizing the known (training) bits that can be included in control signals CNT, for example by providing an absolute phase reference between the transmitted and local oscillator lasers.

In some implementations, one or more symbols-to-bits circuits or components 245-0-1 to 245-19-1 can be included in the Rx processor 300. In such implementations, each of the symbols-to-bits circuits or components 245-0-1 to 245-19-1 can receive the symbols output from a corresponding one of circuits 240-0-1 to 240-19-1 and map the symbols back to bits. For example, each of the symbol-to-bits components 245-0-1 to 245-19-1 can demap one X polarization symbol, in a QPSK or m-QAM constellation, to Z bits, where Z is an integer. For dual-polarization QPSK modulated subcarriers, Z is two. Bits output from each of component 245-0-1 to 245-19-1 are provided to a corresponding one of decoder circuits 260-0 to 260-19.

Y polarization symbols are output from a respective one of circuits 240-0-2 to 240-19-2, each of which has the complex representation $yi+j*yq$ associated with data carried by the Y polarization component. Each Y polarization, like the X polarization symbols noted above, can be provided to a corresponding one of bit-to-symbol circuits or components 245-0-2 to 245-19-2, each of which has a similar structure and operates in a similar manner as symbols-to-bits component 245-0-1 to 245-19-1. Each of circuits 245-0-2 to 245-19-2 can provide an output to a corresponding one of decoder circuits 260-0 to 260-19.

Each of decoder circuits 260 can remove errors in the outputs of symbol-to-bit circuits 245 using, for example, forward error correction. Such error corrected bits, which can include user data, can be supplied to a corresponding one of switch circuits SW-0 to SW-19. Switch circuits SW-0 to SW-19 in each secondary node 112 can selectively supply or block data based on whether such data is intended to be output from a particular node.

Maximum likelihood decoders can provide the best performance for decoding GPC codes. However, these decoders are expensive and complex to implement. Another approach is to implement a turbo decoding structure by iterating between decoding of horizontal and vertical codewords. This approach is used for both hard and soft decoding of this family of codes.

Figure 4:
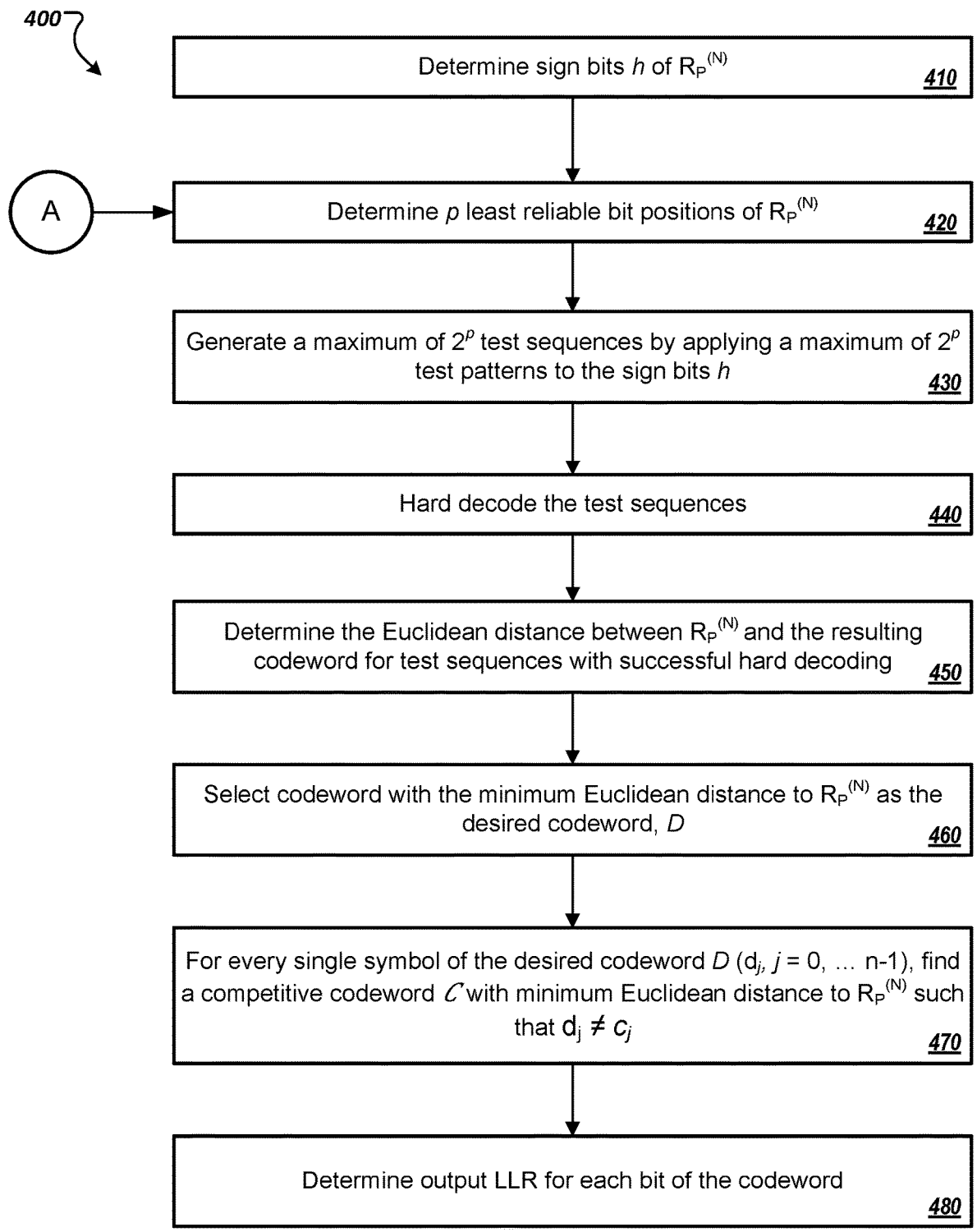
FIG. 4 depicts a flowchart of an example implementation of the Pandiah-Chase II method.

In general, hard decoding can involve decoding of the bit sequences that are obtained from a hard decision of the received symbols at a receiver. Soft decoding can involve considering a reliability value for each bit. For example, if the reliability value is a large positive value, the bit value can be determined to be 1 with high probability. If the reliability is a large negative number, the bit value can be determined to be 0 with high probability. If the reliability value is a small positive number, the bit value can be determined to be 1 with low probability. A soft decision decoder can calculate the likelihood between the soft information of the received codewords sequences and the actual codewords, find the maximum likelihood, and can then select the most likely codeword The Pandiah-Chase II method 400 illustrated in FIG. 4 is a suboptimum decoding method that can be used to decode GPCs. Method 400 can be performed by at least one processor 300 that includes one or more decoders 260-0 to 260-19 to support the decoding operations. A codeword of length n can be decoded for N iterations. A channel log likelihood ratio (LLR) can be expressed as R, and an updated LLR from a previous iteration of decoding can be expressed as $R_p^{(N)}$.

In operation 410, at the beginning of an iteration or after one iteration has been completed and the next one is beginning, the sign bits h of $R_p^{(N)}$ can be determined. For example, after the first iteration (N=1), the sign bits h of the codeword vector $R_p^{(1)}$ can be determined. In operation 420, p chase bits of $R_p^{(N)}$ are determined. The chase bits are bits of the codeword vector $R_p^{(N)}$ that have the lowest reliable values. The reliabilities of the bit values can be determined using the LLR of each codeword bit. The least p reliable bits are considered as chase bits.

After identifying the chase bits, the processor can generate a maximum of $2^p$ test sequences by applying a maximum of $2^p$ test patterns to the sign bits h (operation 430). The test sequences can involve modifying the value of the chase bits from 0 to 1 or vice versa. The test sequences can be hard decoded using one or more suitable syndrome decoding methods (operation 440).

In the process of performing hard decoding, hard decoding of some test sequences may not be successful. However, for test sequences with successful hard decoding, the processor can determine the Euclidean distance between $R_p^{(N)}$ and the resulting codeword for each of the test sequences with a success hard decoding outcome (operation 450). Next, the codeword with the minimum Euclidean distance to the $R_p^{(N)}$ can be selected as the desired codeword (D) (operation 460). Then, for every symbol of the desired codeword D, the processor can determine a competitive codeword C among the successful decoded test sequences with a minimum Euclidean distance to $R_p^{(N)}$ (operation 470). The desired codeword D and the competitive codeword C cannot be the same. After modifying the codeword as needed in operation 470, the updated LLR for every bit of the codeword can be calculated using the following equation (operation 480):

$$R_p^{(N+1)}(j)=R(j)+\alpha^{(N)}\times E^{(N)}(j)$$

In the equation above, $\alpha^{(N)}$ is a scaling factor for iteration N+1 (where "N" is the count number of the previous iteration). E(j) is the extrinsic information for the j-th bit at iteration N+1. As can be appreciated, the updated LLR for the next iteration is equal to the sum of the channel LLR and a scaled value of the extrinsic information. The extrinsic information E(j) for the j-th bit at iteration N+1 can be expressed as:

$$E^{(N)}(j) = \begin{cases} \left(\dfrac{|R_p^N - C(j)|^2 - |R_p^{(N)} - D|^2}{4}\right)*d(j) & \text{if } C(j) \text{ exists} \\ \beta^{(N)} \times d(j) & \text{otherwise} \end{cases}$$

Here, $\beta^{(N)}$ is a scaling factor for iteration N.

While the Pandiah-Chase II method described above is a suboptimum algorithm preferred to estimate ML decoding because it is simpler and cheaper than ML decoding methods, the Pandiah-Chase II method can still be complex and computationally intensive if the number of chase bits or the number of decoding iterations are large. In some applications, a large number of iterations are not required, and a mechanism to perform early termination (ET) of the Pandiah-Chase II method would be beneficial. ET is particularly beneficial when a few first iterations may need to support large number of chase bits.

Figure 5:
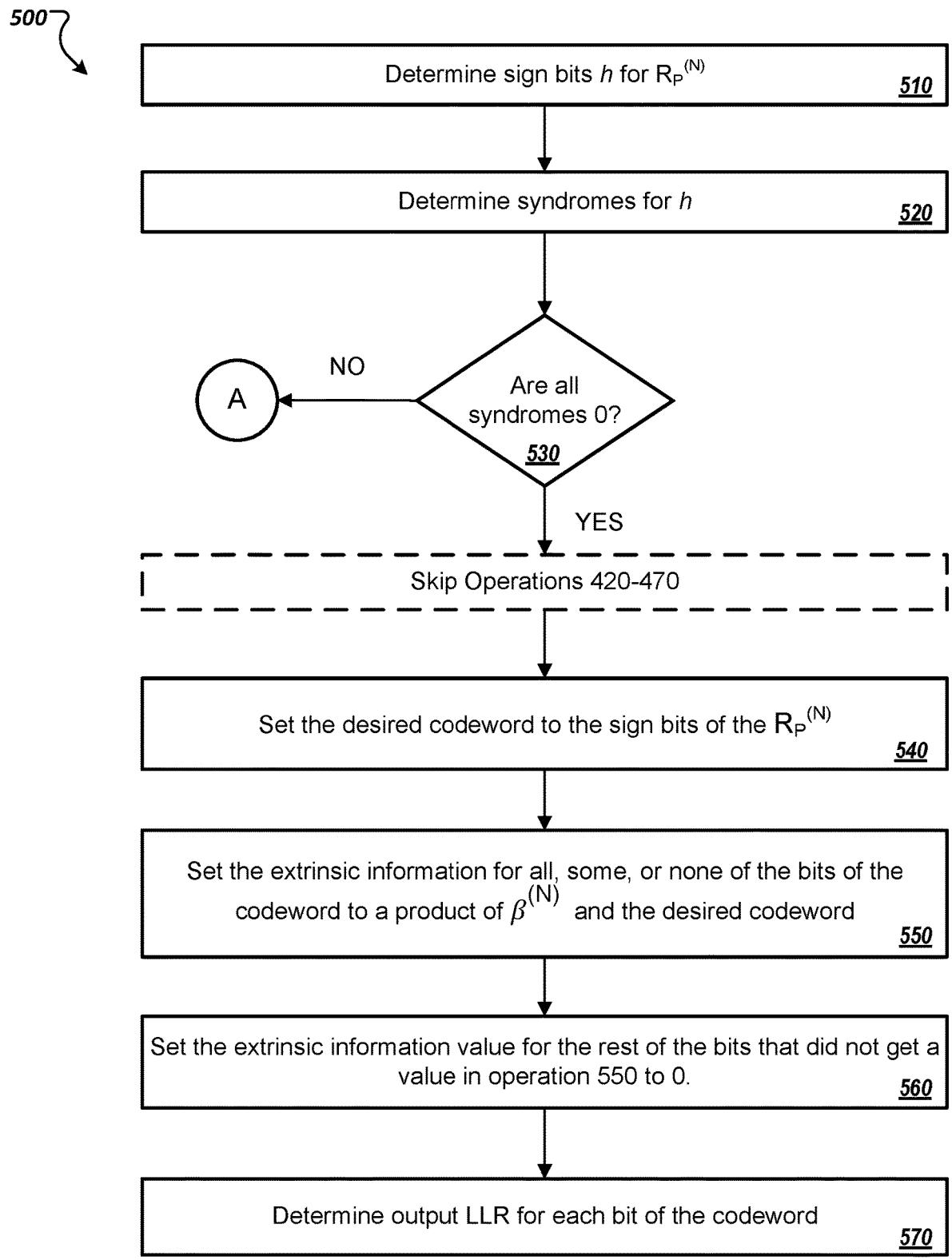
FIG. 5 depicts a flowchart of an example implementation of an early termination method for decoding generalized product codes.

FIG. 5 illustrates an ET method 500 for soft decoding GPC codes. The ET method 500 can be performed by at least one processor 300 that includes one or more decoders 260-0 to 260-19 to support the decoding operations. The first step of the ET method 500 (operation 510) is the same as operation 410 in FIG. 4. Next, the processor can determine whether the syndromes are all zero for sign bits h (operation 520). The processor can determine if all the bits in the codeword are clean (i.e., have valid bits).

If the syndromes are not zero, the ET method 500 can continue with operations 420-480, as described above with respect to FIG. 4. However, if the syndromes are all zero (operation 530) and the codeword is clean, further complex decoding operations may not be necessary to improve performance. Accordingly, operations 420-470 that would have otherwise been typically performed under the Pandiah-Chase II method 400 can be skipped. By skipping these operations, the decoder can save power resources and reduce the number of operations and iterations that otherwise would have been performed.

Instead of performing operations 420-470, the processor can set: (i) the desired codeword to the sign bits of the $R_p^{(N)}$ ($d_j=2*h_j-1$, j=0, . . . , n-1) (operation 540); (ii) the Extrinsic information for all, some, or none of the bits of the codeword to a product of the scaling factor $\beta^{(N)}$ and the desired codeword $E(N)(j)=\beta^{(N)}d_j$ (operation 550); and (iii) the Extrinsic information for any remaining bits not configured in operation 550 to zero E(N)(j)=0 (operation 560). For example, when the GPC code is turbo block product code, the Extrinsic information for all the bits of the codeword can be set. When the GPC code is a convolutional type code, such as CI-BCH, the Extrinsic information for up to half the bits of the codeword can be set. For some other product codes, no Extrinsic information for codeword bits may be set.

By virtue of performing operation 540, the sign of the value for each bit becomes the same as the sign of the corresponding updated LLR from the previous iteration. After setting the values in operations 540-560, the processor can then determine the output LLR for every single bit of the codeword, similar to operation 480 but with different values for the extrinsic information and steps involving less complex operations (operation 570).

The ET method 500 described with respect to FIG. 5 may have additional benefits due to its versatility. For example, the ET method 500 can set Extrinsic information for all or some of the bits of the codeword in some iterations and for none of the bits in other iterations (operation 550 in FIG. 5). Thus, depending on the type of code, e.g., turbo product code (TPC) or CI-BCH code, a different ET approach can be used. For example, for a TPC code, the processor can set the Extrinsic information $E^{(N)}(j)=\beta^{(N)}d_j$ for all or none of the bits of the underlying codeword. In contrast, for CI-BCH codes, the processor can update just the Layer 1 symbols of a codeword when ET is applied on the last soft decoding iteration. In the TPC decoding structure, if none or some of the LLR values do not get updated, the bits do not need to be written back into memory, which can provide power savings by reducing the access rate to the memory.

In some cases in which the ET method is implemented, the number of iterations may be three or fewer iterations. Early termination algorithm can be applied on all the iterations or only on the last few iterations.

More generally, any suitable number of iterations can be performed, although implementation of the ET method will still result in considerable power savings for the processor. After the ET method is performed, decoding operations for the data being decoded can terminate, and the resulting decoded data can be provided to switches SW-0 to SW-19 and/or other components of the receiving device for further processing and/or storage. In some implementations, the input and/or output of the decoder can be connected to a memory device so that data can be obtained from the memory device, e.g., a buffer, or can be stored in the memory after completing the decoding operations. For example, after completing one decoding iteration, the decoded data and any associated data can be stored in a memory device and subsequently recalled by the decoder to initiate the next decoding iteration.

While this specification contains many specifics, these should not be construed as limitations on the scope of the disclosure or of what may be claimed, but rather as descriptions of features specific to particular implementations. Certain features that are described in this specification in the context of separate implementations may also be combined. Conversely, various features that are described in the context of a single implementation may also be implemented in multiple implementations separately or in any suitable sub-combination. Moreover, although features may be described above as acting in certain combinations and may even be claimed as such, one or more features from a claimed combination may, in some cases, be excised from the combination, and the claimed combination may be directed to a sub-combination or variation of a sub-combination. For example, although the mapping operation is described as a series of discrete operations, the various operations may be divided into additional operations, combined into fewer operations, varied in order of execution, or eliminated, depending on the desired implementation. Similarly, the separation of various system components in the implementations described above should not be understood as requiring such separation in all implementations.

Some implementations of subject matter and operations described in this specification can be implemented in digital electronic circuitry, or in computer software, firmware, or hardware, including the structures disclosed in this specification and their structural equivalents, or in combinations of one or more of them. For example, in some implementations, some or all of the components described herein can be implemented using digital electronic circuitry, or in computer software, firmware, or hardware, or in combinations of one or more of them. In another example, one or more of the operations described above with respect to FIGS. 4 and 5 can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium also can be, or can be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows also can be performed by, and apparatus also can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

A computer system may include a single computing device, or multiple computers that operate in proximity or remote from each other and typically interact through a communication network. Examples of communication networks include a local area network ("LAN") and a wide area network ("WAN"), an inter-network (e.g., the Internet), and peer-to-peer networks (e.g., ad hoc peer-to-peer networks). A relationship of client and server may arise by virtue of computer programs running on the respective computers and having a client-server relationship to each other.

Terms used herein and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together. The term "and/or" is also intended to be construed in this manner.

The use of the terms "first," "second," "third," etc., are not necessarily used herein to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

Various modifications can be made to the foregoing examples. Accordingly, other implementations also are within the scope of the claims.

What is claimed is:

1. A device comprising:
a receiver configured to receive a communication signal from a communication network, the communication signal comprising data encoded using a generalized product code; and
at least one processor coupled to the receiver and comprising a decoder, the decoder being configured to (a) determine a codeword associated with the data encoded using the generalized product code, (b) determine syndromes for sign bits in the codeword; and decode the data encoded using the generalized product code (I) according to a first decoding scheme in response to a first condition not being satisfied and to repeat the first decoding scheme for a determined number of iterations, and (ii) according to a second decoding scheme in response to the first condition being satisfied, the second decoding scheme involving a second number of iterations fewer than the determined number of iterations, wherein the first condition is satisfied when the syndromes are zero, and wherein the at least one processor is further configured to, in response to decoding the data encoded using the generalized product code according to the second decoding scheme:
configure a second codeword;
set values of one or more bits in a first portion of extrinsic information associated with the second codeword according to a product of a scaling factor and the second codeword; and
set values of one or more bits in a remaining portion of the extrinsic information associated with the second codeword to zero.

2. The device of claim 1, wherein:
the first decoding scheme comprises a Pyndiah-Chase decoding scheme; and
the second decoding scheme comprises an early termination scheme in which multiple operations of the Pyndiah-Chase decoding scheme are not performed.

3. The device of claim 1, wherein the second number of iterations comprises three iterations.

4. The device of claim 1, wherein the at least one processor is configured to utilize less power when operating according to the second decoding scheme than when operating according to the first decoding scheme.

5. The device of claim 1, wherein the generalized product code comprises a turbo block code or a continuously interleaved Bose-Chaudhuri-Hocquenghem code.

6. A method to decode data encoded using a generalized product code in a communication signal, the method comprising:
receiving, from a communication network, the communication signal with the data encoded using the generalized product code;
determining syndromes for sign bits in a codeword associated with the data encoded using the generalized product code;
determining, by at least one processor, to apply a first decoding scheme in response to a first condition not being satisfied and to apply a second decoding scheme in response to the first condition being satisfied, the first condition being satisfied when the syndromes are zero; and
decoding, by the at least one processor, the codeword associated with the data encoded using the generalized product code, the decoding being based on the first decoding scheme in response to the first condition not being satisfied and based on the second decoding scheme in response to the first condition being satisfied, the method further comprising:
after performing at least one iteration of the first decoding scheme:
determining syndromes for the second set of sign bits;
determining, by the at least one processor, to apply the first decoding scheme in response to the first condition not being satisfied and to apply the second decoding scheme in response to the first condition being satisfied, the first condition being satisfied when the syndromes for the second set of sign bits are zero;
decoding, by the at least one processor, the codeword generate as a result of performing the at least one iteration based on the first decoding scheme in response to the first condition not being satisfied and the second decoding scheme in response to the first condition being satisfied; and
in response to applying the second decoding scheme;
configuring a second codeword using the sign bits;

setting values of one or more bits in a first portion of extrinsic information associated with the second codeword according to a product of a scaling factor and the second codeword; and setting values of one or more bits in a remaining portion of the extrinsic information associated with the second codeword to zero.

7. The method of claim 6, wherein:

the first decoding scheme comprises a Pyndiah-Chase decoding scheme; and the second decoding scheme comprises an early termination scheme in which multiple operations of the Pyndiah-Chase decoding scheme are not performed.

8. The method of claim 6, further comprising:

determining the sign bits in a codeword vector corresponding to the codeword associated with the data encoded using the generalized product code, wherein syndromes are determined for the sign bits in the codeword vector that is associated with the data encoded using the generalized product code.

9. The method of claim 6, wherein the generalized product code comprises a turbo block code or a continuously interleaved Bose-Chaudhuri-Hocquenghem code.

10. The method of claim 6, comprising:

utilizing, by the at least one processor, less power when operating according to the second decoding scheme than when operating according to the first decoding scheme.

11. The method of claim 7, further comprising:

in response to applying the second decoding scheme:
setting values of all bits of extrinsic information associated with the second codeword according to a product of a scaling factor and the second codeword.

12. The method of claim 6, further comprising:

in response to applying the second decoding scheme:
setting values of all bits of extrinsic information associated with the second codeword to zero.

13. The method of claim 6, further comprising:

determining an output log likelihood ratio for each bit of the codeword.

14. The method of claim 6, wherein the at least one processor performs fewer decoding iterations when applying the second decoding scheme than when applying the first decoding scheme.

15. The method of claim 6, further comprising:

terminating the method to decode the data encoded using the generalized product code after performing an iteration of the second decoding scheme.

16. A receiver comprising:

a memory device configured to store data and provide the data to one or more components of the receiver; and a decoder coupled to the memory device and configured to obtain the data from the memory device, the decoder being configured to:

determine sign bits of a codeword in the data obtained from the memory device, the codeword being encoded using a generalized product code;

determine syndromes for the sign bits; and decode the codeword based on a first decoding scheme when the syndromes for the sign bits are not zero and based on a second decoding scheme when the syndromes for the sign bits are zero, configure a second codeword, using the sign bits, when the syndromes for the sign bits are zero, wherein:

the first decoding scheme comprises a Pyndiah-Chase decoding scheme;

the second decoding scheme comprises an early termination scheme in which multiple operations of the Pyndiah-Chase decoding scheme are not performed;

values of one or more bits in a first portion of extrinsic information associated with the second codeword are set according to a product of a scaling factor and the second codeword; and values of one or more bits in a remaining portion of the extrinsic information associated with the second codeword are set to zero.

* * * * *